(12) United States Patent
Narita et al.

(10) Patent No.: US 9,397,538 B2
(45) Date of Patent: Jul. 19, 2016

(54) LINEAR MOTOR

(75) Inventors: Jun-ichi Narita, Chiryu (JP); Ryo Nagata, Chiryu (JP); Masaki Kurono, Chiryu (JP)

(73) Assignee: FUJI MACHINE MFG. CO., LTD., Aichi (JP)

( * ) Notice: Subject to any disclaimer, the term of this patent is extended or adjusted under 35 U.S.C. 154(b) by 17 days.

(21) Appl. No.: 14/370,137

(22) PCT Filed: Jan. 10, 2012

(86) PCT No.: PCT/JP2012/050264
§ 371 (c)(1),
(2), (4) Date: Jul. 1, 2014

(87) PCT Pub. No.: WO2013/105214
PCT Pub. Date: Jul. 18, 2013

(65) Prior Publication Data
US 2014/0375148 A1    Dec. 25, 2014

(51) Int. Cl.
| | |
|---|---|
| *H02K 41/00* | (2006.01) |
| *H02K 9/22* | (2006.01) |
| *H02K 3/24* | (2006.01) |
| *H02K 41/03* | (2006.01) |
| *H02K 9/20* | (2006.01) |
| *H02K 41/02* | (2006.01) |

(52) U.S. Cl.
CPC .. *H02K 9/22* (2013.01); *H02K 3/24* (2013.01); *H02K 9/20* (2013.01); *H02K 41/02* (2013.01); *H02K 41/03* (2013.01); *H02K 41/031* (2013.01)

(58) Field of Classification Search
CPC ....... H02K 41/031; H02K 41/02; H02K 9/22; H02K 9/20; H02K 41/03; H02K 9/19; H02K 3/24
USPC ........................................... 310/12.29
See application file for complete search history.

(56) References Cited

U.S. PATENT DOCUMENTS

| | | | | |
|---|---|---|---|---|
| 5,920,164 A | * | 7/1999 | Moritz | H02K 9/20 318/135 |
| 6,278,203 B1 | * | 8/2001 | Novak | G03F 7/70758 310/12.06 |
| 6,661,124 B1 | * | 12/2003 | Seki | H02K 3/24 310/12.21 |
| 7,385,317 B2 | * | 6/2008 | Sugita | H02K 41/03 310/12.15 |

(Continued)

FOREIGN PATENT DOCUMENTS

| | | |
|---|---|---|
| JP | 2008 48561 | 2/2008 |
| JP | 2008 61458 | 3/2008 |

(Continued)

OTHER PUBLICATIONS

International Search Report Issued Apr. 10, 2012 in PCT/JP12/050264 Filed Jan. 10, 2012.

*Primary Examiner* — Joshua Benitez-Rosario
*Assistant Examiner* — Leda Pham
(74) *Attorney, Agent, or Firm* — Oblon, McClelland, Maier & Neustadt, L.L.P

(57) ABSTRACT

A linear motor with enhanced cooling performance, including: a stator including multiple magnetic force generating members provided in a row; a moving element including multiple coils provided in a row in an axis line direction of the stator and wound around an outside of the stator; and a heat transfer member dissipating heat generated by the coil which is between adjacent coils and along a side of the coils.

4 Claims, 7 Drawing Sheets

(56) References Cited

U.S. PATENT DOCUMENTS

2010/0181848 A1* 7/2010 Nagasaka ............... H02K 41/03
310/12.29
2011/0198946 A1 8/2011 Koshimoto et al.

FOREIGN PATENT DOCUMENTS

| JP | 2008061458 A | * | 3/2008 |
| WO | 2006 040913 | | 4/2006 |
| WO | 2010 047129 | | 4/2010 |

* cited by examiner

FIG.4   Cross section B-B
20

FIG.5 (A)
RELATED ART
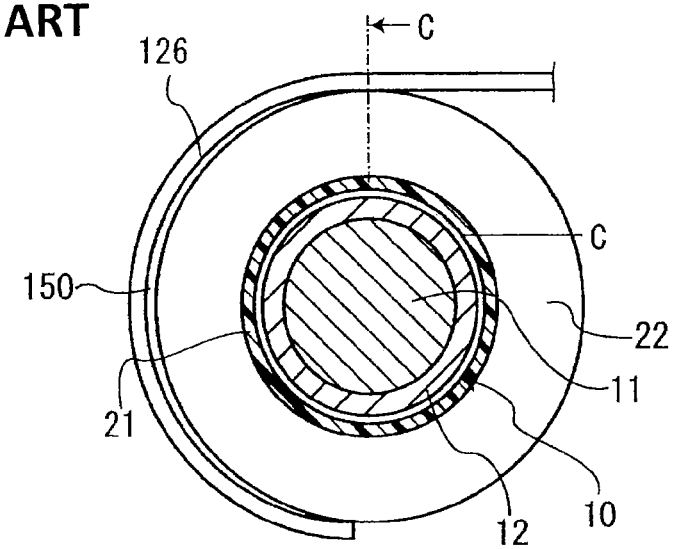
(B)
Cross section C-C
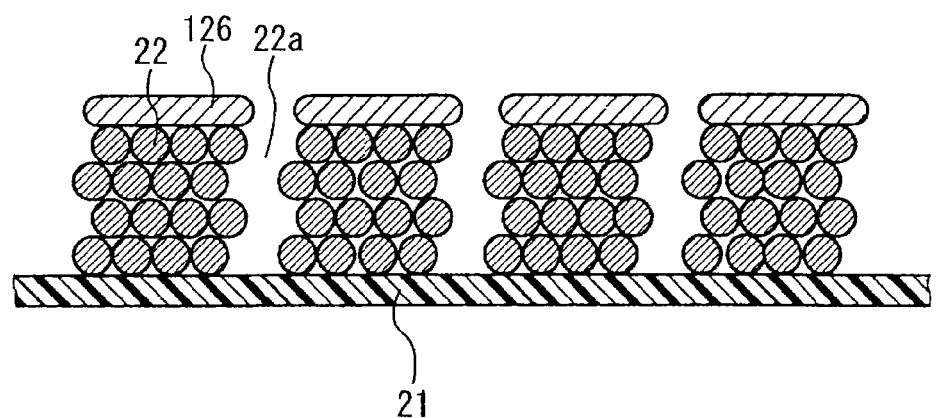

LINEAR MOTOR

TECHNICAL FIELD

The present invention relates to a structure for cooling the coil of a linear motor.

BACKGROUND ART

As disclosed in patent literature 1, conventionally linear motors are used in moving devices for moving mounting heads of electronic component mounter machines. This kind of linear motor comprises a moving element which has multiple coils wound around the outer circumference of a bobbin and a stator which has multiple permanent magnets provided on the interior of a bobbin. And, this linear motor dissipates heat generated by the coil using a heat dissipation member which is attached contacting along the outer circumference surface of the coil, to prevent heat accumulating in the coil and to prevent burnout of the coil.

CITATION LIST

Patent Literature

Patent Literature 1: Publication number WO2006/040913 (FIG. 1)

SUMMARY OF INVENTION

Problem to be Solved by the Invention

However, the form of the outer circumference surface of each coil is different for each coil, and, because the curvature radius of the outer circumference surface of each coil and the curvature radius of the inner circumference surface of the heat dissipation member do not match, a gap opens undesirably between the outer circumference surface of the coil and the inner circumference surface of the heat dissipation member, the heat transfer to the heat dissipation member from the coil is insufficient, and there is the problem that it is not possible to dissipate enough of the heat generated by the coil with the heat dissipation member. Due to this, there is a problem that, in order to prevent burnout of the coil, the amount of current which is circulated through the coil is limited, and the moving speed of the moving device is limited.

The present invention is an item which takes account of such circumstances and takes as its object a linear motor with enhanced cooling performance.

Means for Solving the Problem

The present invention of a linear motor from claim 1 which solves the above problem is a linear motor comprising a stator which has multiple magnetic force generating members provided in a row, and a moving element which has multiple coils provided in a row in the axis line direction of the stator and wound around the outside of the stator, and is provided with a heat transfer member for dissipating heat generated by the coil which is between adjacent coils and along the side of the coils.

Because the heat transfer member is provided between adjacent coils and along a side surface of the coils in this way, the coil side surface and heat transfer member contact at a flat surface not a curved surface, and the coil side surface and heat transfer member contact reliably. Due to this, heat generated by the coil is reliably transferred by the heat transfer member, heat generated by the coil is reliably dissipated via the heat transfer member and it is possible to improve the cooling performance of the linear motor. Also, because heat transfer members contact both side surfaces of the coil, compared to previously, more heat generated by the coil can be transferred to the heat transfer members.

For the present invention from claim 2, the heat transfer member of claim 1 is a heat pipe comprising a heat collection section flat in the coil diameter direction and heat dissipation section which contacts the heat collecting section and protrudes in a direction away from the coil, and a heat dissipation member is provided on the heat dissipation section. By this, the working fluid in the heat collection section contacting the side surface of the coil evaporates and absorbs latent heat, the evaporated working fluid is cooled by the heat dissipation member when it moves to the heat dissipation section, and the working fluid condenses and releases latent heat. Due to this, heat generated by the coil can be dissipated efficiently by the heat dissipation member.

For the present invention from claim 3, the heat dissipation section of claim 2 is located above the heat collection section. By this, working fluid evaporated in the heat collection section is reliably moved to the heat dissipation section, and the working fluid condensed in the heat dissipation section reliably returns to the heat collection section by its own weight. Due to this, because the working fluid repeatedly evaporates and condenses between the heat collection section and heat dissipation section and circulates reliably, it is possible for the heat generated in the coil to be reliably dissipated by the heat dissipation member.

For the present invention from claim 4, the heat transfer member of claims 1 to 3 is provided in the gap formed between the adjacent coils in order to give an outgoing line to outside the coil for the wire wound at the beginning or the wire wound at the end of the coil. By this, by providing a heat transfer member in the conventional gap between adjacent coils, as well as not having to make the moving element large, it is possible to enhance the cooling performance of the coil.

BRIEF DESCRIPTION OF DRAWINGS

FIG. 5 This is a diagram illustrating a conventional linear motor as a comparative example, where (A) is a cross section of a conventional linear motor and B is a cross section of C-C of (A).

DESCRIPTION OF EMBODIMENTS

Description of the Linear Motor of the Present Embodiment

This describes linear motor 100 which is one embodiment of the present invention using FIGS. 1 to 4 below. Note that, in FIG. 1 and FIG. 2, yoke 23 (shown in FIG. 3) mentioned below is omitted. Also, linear motor 100 of the present embodiment is used in a moving device for moving the mounting head of an electronic component mounter machine, but the configuration of an electronic component mounter machine is disclosed in the above patent literature 1 and Japanese Unexamined Patent Application Publication No. 2010-172070 and is common knowledge, so a description is omitted.

Figure 1:
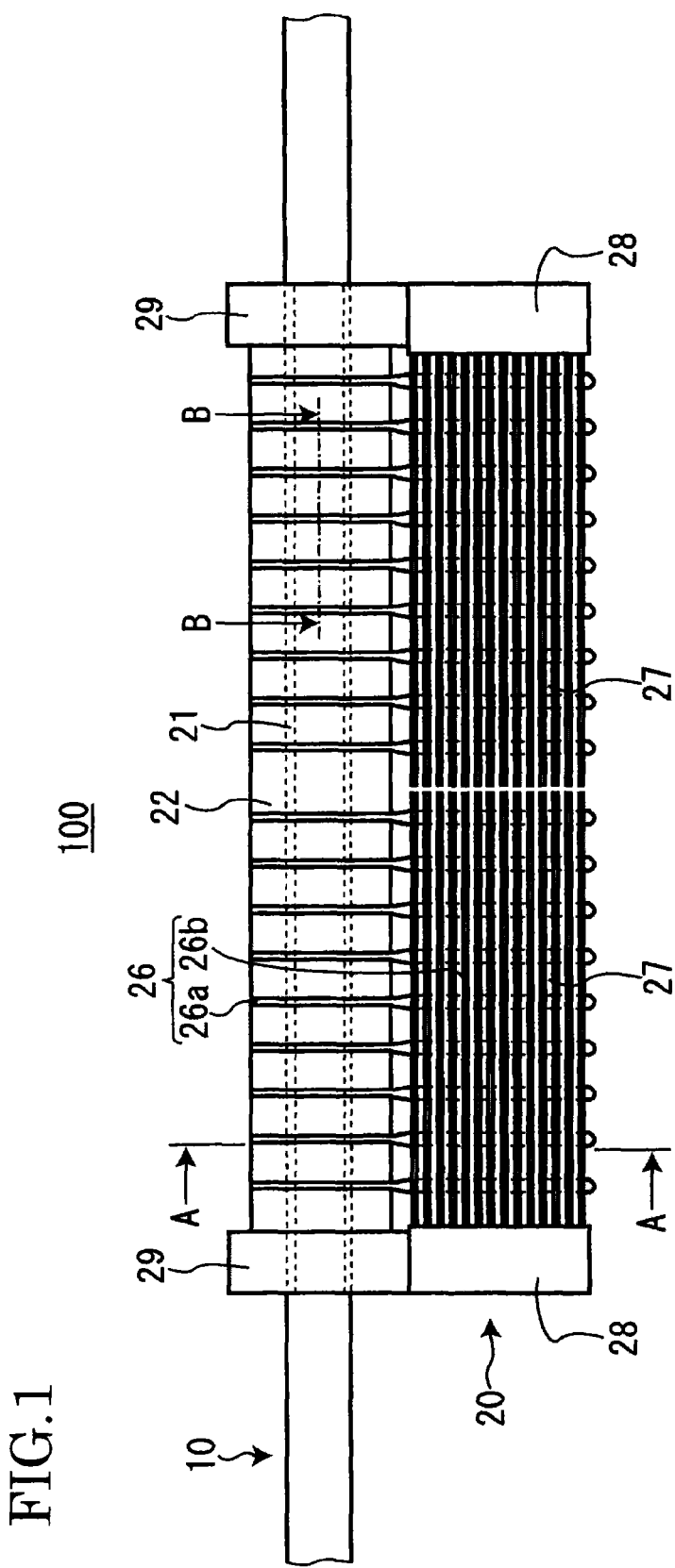
FIG. 1 This is a top view of the linear motor of the present embodiment.

Linear motor 100 of the present embodiment is a three-phase linear motor, and, as shown in FIG. 1, comprises stator 10 and moving element 20 which is movably attached to this stator 10. Stator 10 is loaded on the base frame of an electronic component mounter machine, a mounting head is attached to moving element 20 and a linear guide which is not shown in the figures, and the mounting head which is the member to be moved is capable of being moved with respect to the base frame along a path specified in advance.

Figure 3:
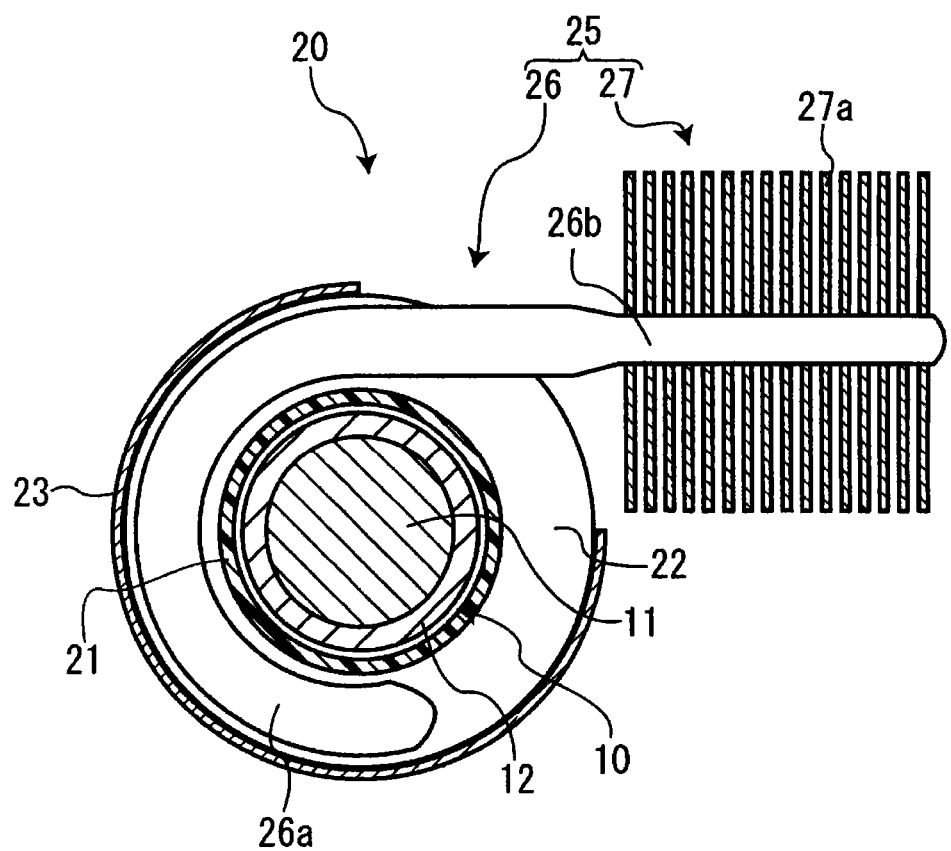
FIG. 3 This is a cross section of A-A of FIG. 1.

As shown in FIG. 3, stator 10 has cylindrical pipe 12 and multiple cylindrical pillar shaped permanent magnets 11 stored in this pipe 12. Pipe 12 comprises a non-magnetic member (such as stainless steel) to penetrate the magnetic flux of each permanent magnet 11. Permanent magnets 11 are provided together inside pipe 12 in a straight line so that the S pole and N pole of adjacent permanent magnets 11 are facing each other sandwiching a spacer (not shown in the figures) described below. Further, a flat cylindrical pillar shaped spacer (not shown in the figures) comprising a magnetic body such as iron is sandwiched in between adjacent permanent magnets 11. This spacer performs the role of a yoke.

Figure 4:
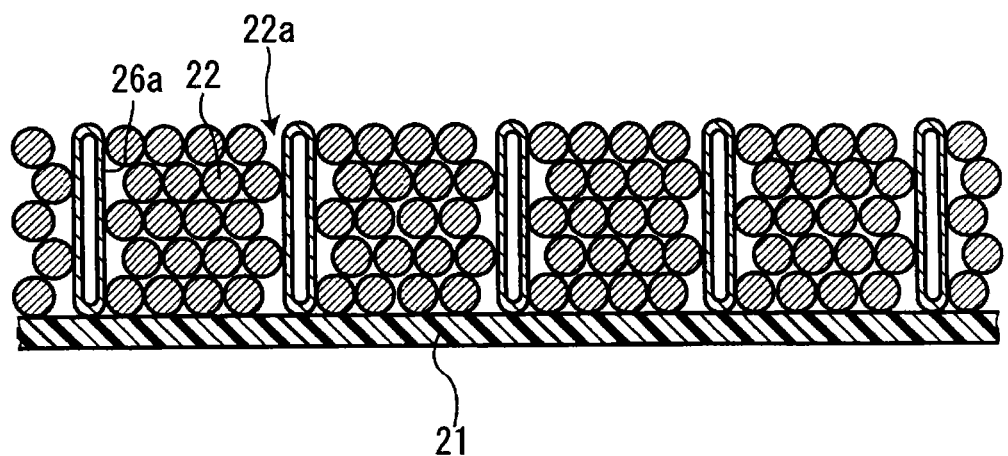
FIG. 4 This is a cross section of B-B of FIG. 1.

As shown in FIGS. 1 to 4, moving element 20 has bobbin 21, multiple coils 22, and cooling member 25. Bobbin 21 is a cylindrical non-magnetic material such as synthetic resin and stator 10 is inserted through the inside thereof. Multiple coils 22 are wound around the outer circumference surface of bobbin 21 and multiple thereof are provided at fixed intervals in the axis line direction of bobbin 21. In other words, multiple coils 22 are wound around the outside of stator 10 and are provided in a line in the axis line direction of stator 10. As shown in FIG. 4, gap 22a is formed between adjacent coils 22 to give an outgoing line to outside coil 22 for the wire wound at the beginning or the wire wound at the end of coil 22. As shown in FIG. 1, terminal member 29 is attached to both ends of bobbin 21 and both sides of coil 22 which is at both ends contact terminal member 29.

Cooling member 25 comprises heat transfer member 26 and heat dissipation member 27 and is made from a metal such as aluminum or copper with high heat conduction properties. Heat transfer member 26 is provided between coils 22 adjacent in the axis line direction of bobbin 21 (stator 10). With a hollow interior, heat transfer member 26 is a heat pipe inside which is enclosed working fluid and a reticulated wick. As shown in FIG. 3, heat transfer member 26 comprises heat collection section 26a which contacts about half of a side surface of coil 22 and heat dissipation section 26b which extends from an end of this heat collection section 26a in a direction away (outside) from the center of coil 22. Heat collection section 26a is an arc with a width smaller than the width of the cylinder surface of coil 22, is flat in the diameter direction of coil 22, and contacts the side surface of coil 22. As shown in FIG. 3, heat dissipation section 26b is located above (including the upper part to the top edge and horizontal position) heat collection section 26a. Further, it is preferable for cooling member 25 to comprise a non-magnetic body so that it will not be subject to adverse magnetic effects.

Further, during the manufacture of moving element 20, after arranging heat collection section 26a between adjacent coils 22, coils 22 are attached firmly to heat collection section 26a by applying a load to coils 22 at both sides in the direction in which coils 22 at both sides reciprocally adjoin (in the compression direction). And, in this state, a thermosetting resin is put into the gap between fellow coils 22 and the gap between coil 22 and heat collection section 26a, and by thermosetting that thermosetting resin, as well as improving the heat conductance from coil 22 to heat collection section 26a, each coil 22 is fixed firmly to bobbin 21.

As shown in FIG. 1 to FIG. 4, heat dissipation member 27 is attached to heat dissipation section 26b. In the present embodiment, heat dissipation member 27 is provided with many fins 27a which contact heat dissipation section 26b. Fan 28 is provided at the end of heat dissipation member 27 and heat dissipation member 27 is covered with a duct not shown in the figures. Heat dissipation member 27 is cooled by air being blown inside heat dissipation member 27 by fan 28.

As shown in FIG. 3, yoke 23 comprising magnetic material such as electromagnetic steel sheet is attached so that it covers the outer circumference surface of coil 22. By this yoke 23, the direction of the magnetic field lines generated by permanent magnets 11 are changed to be a direction perpendicular to the direction of the current flowing through coil 22, thereby increasing the thrust created by coil 22. However, yoke 23 is not essential.

Multiple coils 22 operate in the order U phase, V phase, W phase, U phase, V phase, W phase and so on. When alternating current for which the phase is deviated each 120 degrees by the respective electrical angle is flowed through coils 22 in each respective phase, thrust to moving element 20 is generated through the interaction of the magnetic force of permanent magnets 11 and the magnetic force of coils 22, and moving element 20 moves with respect to stator 10. Here, coil 22 generates heat, but, as given above, heat generated by coil 22 is dissipated by cooling member 25.

(Description of a Conventional Linear Motor as a Comparative Example)

This describes a conventional linear motor as a comparative example and the differences to linear motor 100 of the present embodiment using FIG. 5 below. Note that, for the sections of the conventional linear motor which have the same configuration as linear motor of the present embodiment, the same numbers are used and those descriptions are omitted.

As shown in (A) of FIG. 5, in a conventional linear motor, heat transfer member 126 is provided contacting along the outer circumference surface of coil 22. However, the shape of the outer circumference surface of each coil 22 is not the same depending on each coil 22, and, because the curvature radius of the outer circumference surface of each coil 22 and the curvature radius of the inner circumference surface of heat transfer member 126 do not match, gap 150 opens undesirably between the outer circumference surface of coil 22 and the inner circumference surface of heat transfer member 126. Due to this, the heat transfer from coil 22 to heat transfer member 126 is insufficient.

Also, as shown in (B) of FIG. 5, because conventionally the configuration is such that heat transfer member 126 contacts only the outer circumference surface of coil 22, for example, even if the heat transfer member 126 contacts the outer circumference surface of coil 22, the heat conduction from coil 22 to the heat dissipation member is insufficient.

(Description of the Effects of the Linear Motor of the Present Embodiment)

As described in detail above, according to linear motor 100 of the present embodiment, as shown in FIG. 3 and FIG. 4, heat transfer member 26 is provided between adjacent coils 22 along a side surface of coil 22. By this, as shown in FIG. 4, the side surface of coil 22 and heat transfer member 26 contact at a flat surface not a curved surface, and the side surface of coil 22 and heat transfer member 26 contact reliably. Due to this, heat generated by coil 22 is reliably transferred to heat transfer member 26, heat generated by coil 22 is reliably dissipated via heat transfer member 26 and it is possible to improve the cooling performance of linear motor 100. Also, because heat transfer members 26 contact both side surfaces of coil 22, compared to previously, more heat generated by coil 22 can be transferred to heat transfer members 26. Also, during the manufacture of moving element 20, after arranging heat collection section 26a between adjacent coils 22, coils 22 can be attached to heat collection section 26a by applying a load to coils 22 at both sides in the direction in which coils 22 at both sides reciprocally adjoin (in the compression direction), and heat generated by coil 22 can be reliably transferred to heat transfer member 26.

Also, as shown in FIG. 5, conventional heat transfer member 126 contacts along the outer circumference surface of coil 22. On the other hand, in the present embodiment, as shown in FIG. 4, heat transfer member 26 is provided in gap 22a between adjacent coils 22. By this, the quantity of winds of coil 22 can be increased by exactly the thickness of heat transfer material 126, and the magnetic force generated by coil 22 can be improved. Due to this, the moving speed of moving element 20 with respect to stator 10 can be increased.

Figure 2:
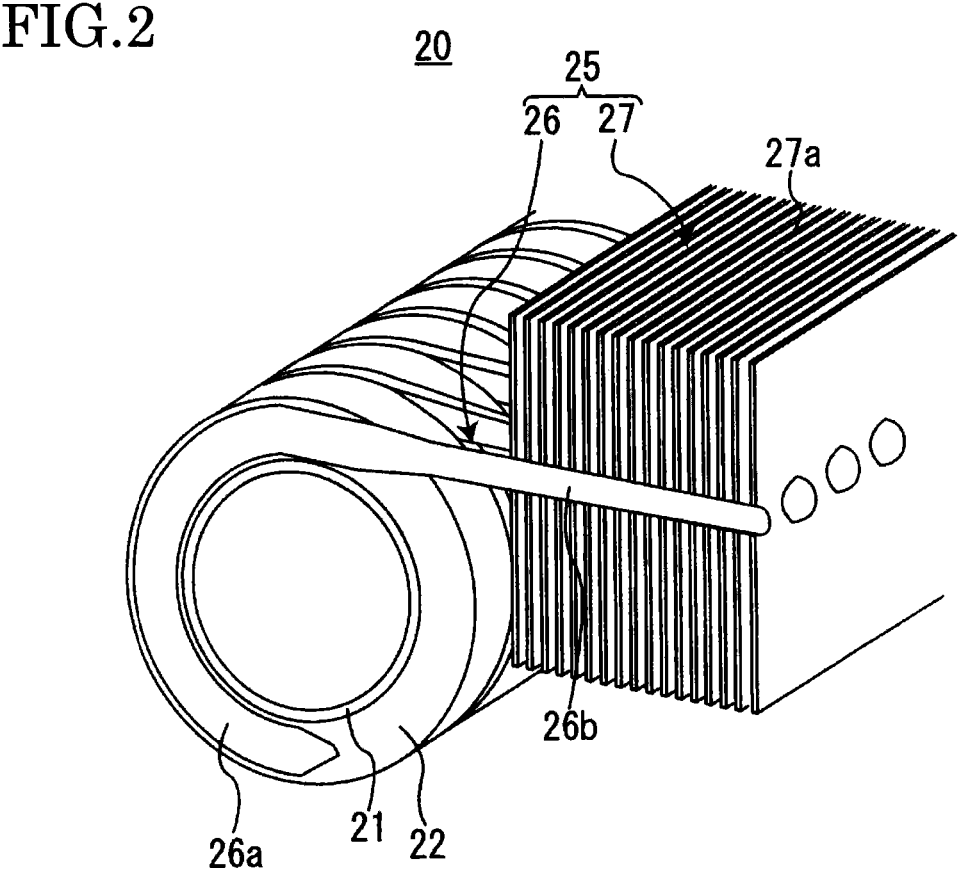
FIG. 2 This is a perspective view of the moving element.

Also, as shown in FIGS. 2 to 4, heat transfer member 26 is a heat pipe comprising heat collection section 26a flat in the coil 22 diameter direction and heat dissipation section 26b which contacts heat collection section 26a in a direction away from coil 22, and heat dissipation member 27 is provided on heat dissipation section 26b. By this, the working fluid in heat collection section 26a contacting the side surface of coil 22 evaporates and absorbs latent heat, the evaporated working fluid is cooled by heat dissipation member 27 when it moves to heat dissipation section 26b, and the working fluid condenses and releases latent heat. Due to this, heat generated by coil 22 can be dissipated efficiently by heat dissipation member 27. Further, as given above, even when coils 22 are attached firmly to heat collection section 26a by applying a load to the coil 22 at both sides, heat transfer member 26 which is a heat pipe is pushed by the side surface of coils 22 which is flat, so that a load is applied to the heat pipe evenly and the heat pipe is not easily crushed.

Also, as shown in FIG. 3, heat dissipation section 26b is located above heat collection section 26a. By this, working fluid evaporated in heat collection section 26a is reliably moved to heat dissipation section 26b, and the working fluid condensed in heat dissipation section 26b reliably returns to heat collection section 26a by its own weight. Due to this, because the working fluid repeatedly evaporates and condenses between heat collection section 26a and heat dissipation section 26b and circulates reliably, it is possible for the heat generated in coil 22 to be reliably dissipated by heat dissipation member 27.

Also, as shown in FIG. 4, heat collection section 26a (heat transfer member) is provided in gap 22a formed between adjacent coils 22 in order to give an outgoing line to outside coil 22 for the wire wound at the beginning or the wire wound at the end of coil 22. By this, by providing heat collection section 26a in conventional gap 22a between adjacent coils 22, as well as not having to make moving element 20 large, it is possible to enhance the cooling performance of coil 22.

Further, in the embodiment given above, permanent magnet 11 is used as the magnetic force generating member which generates a magnetic force, but there is no impediment to using an electromagnet as the magnetic force generating member. Also, in the embodiment given described above, bobbin 21 and coil 22 are cylindrical, but there is no impediment to them being cuboid. In this embodiment also, heat collection section 26a is formed along the side of coil 22 and contacts the side of coil 22. Also, there is no impediment to heat collection section 26a contacting almost the entire side surface of coil 22.

Also, in the embodiment described above, stator 10 comprises cylindrical pipe 12 and multiple cylindrical pillar shaped permanent magnets 11 stored in this pipe 12. However, there is no impediment to stator 10 comprising multiple ring shaped permanent magnets provided together in a straight line and a cylindrical pillar shaped rod going through these multiple ring shaped permanent magnets. For the permanent magnets of this embodiment, items for which the outside thereof is the N pole while the inside thereof is the S pole, and items for which the outside thereof is the S pole while the inside thereof is the N pole are provided together in a straight line so that the magnetic poles are alternating. Further, a spacer comprising a non-magnetic body is sandwiched between adjacent permanent magnets.

Figure 6:
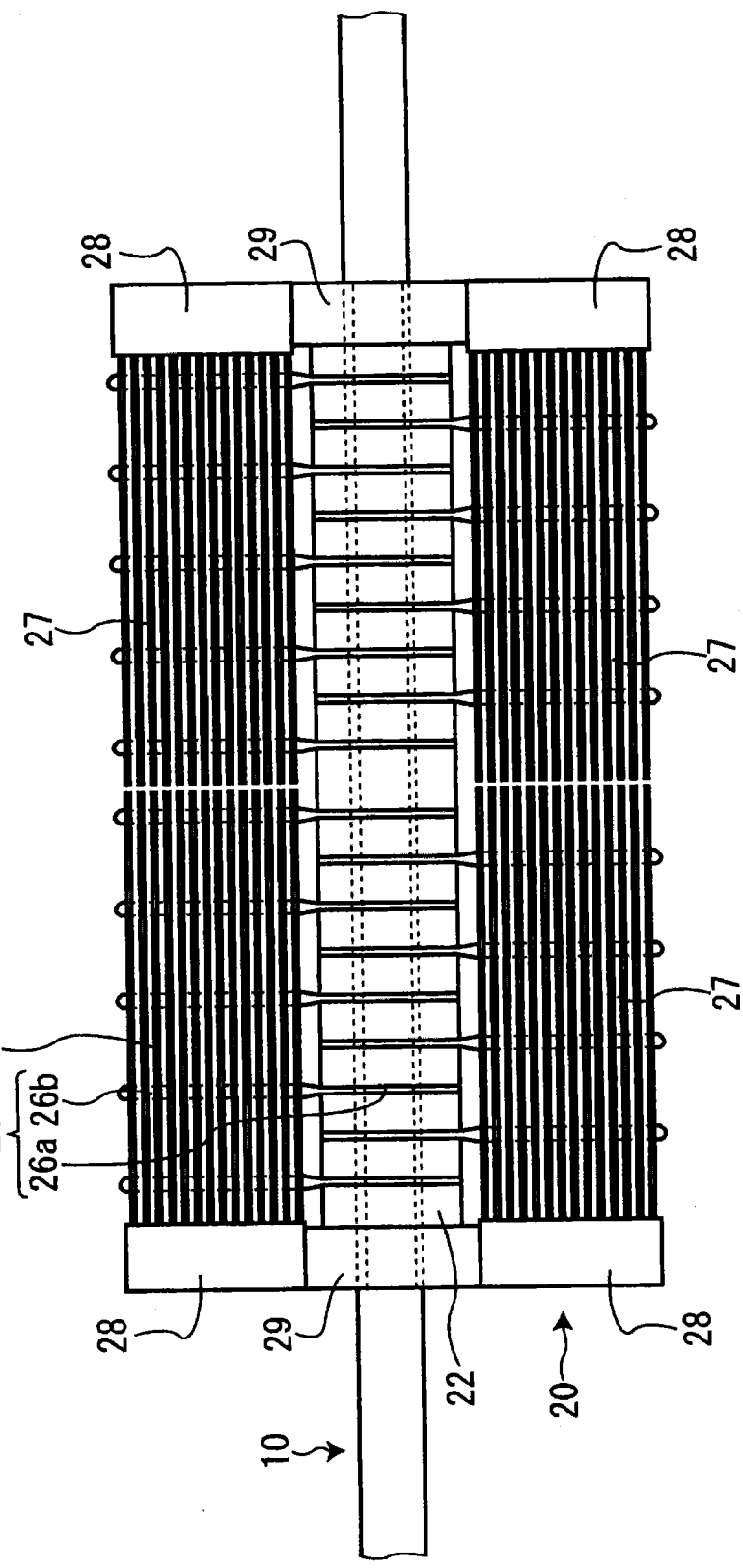
FIG. 6 This is a top view of the linear motor of the embodiment provided with a cooling member on both sides of the coil.
Figure 7:
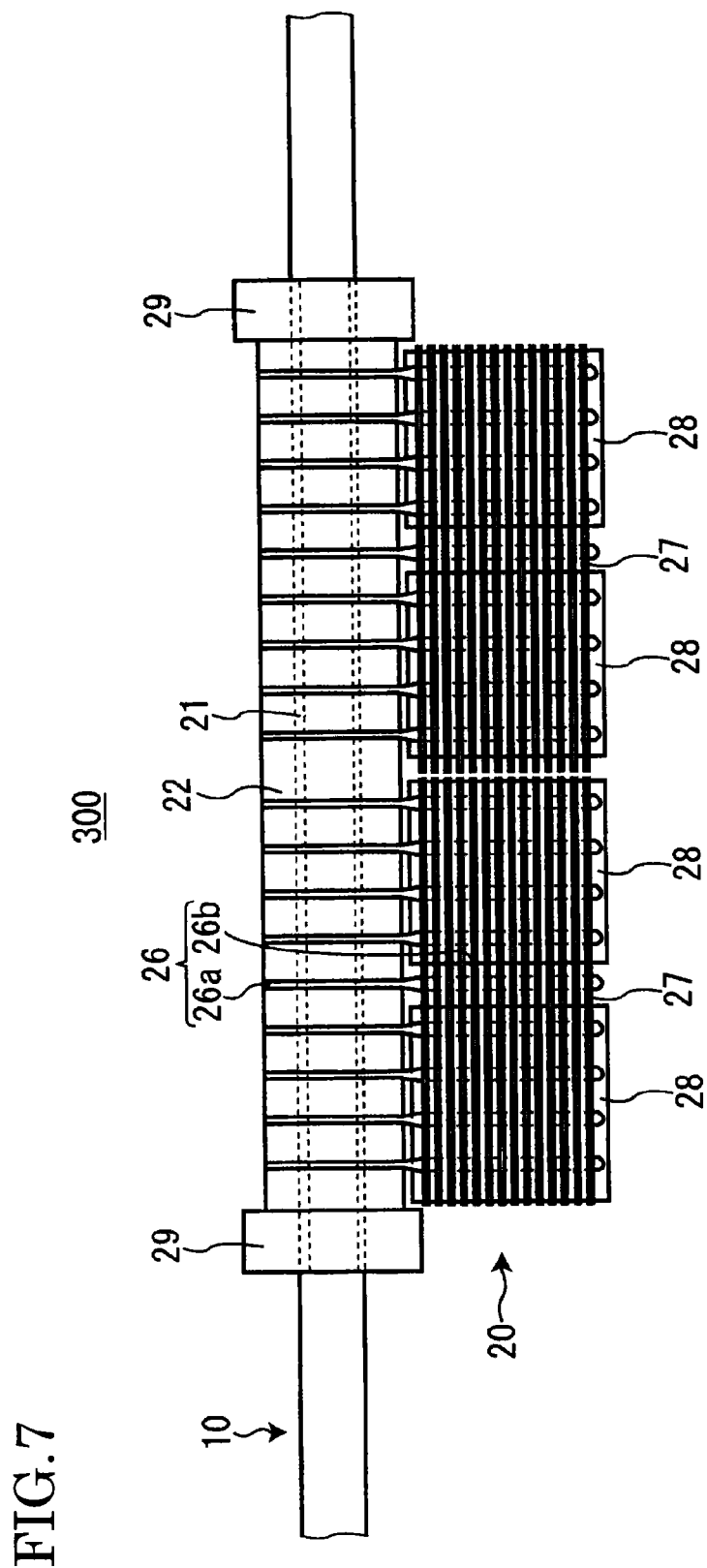
FIG. 7 This is a top view of the linear motor of the embodiment provided with multiple fans in the longitudinal direction of the heat dissipation member.

Also, as shown in FIG. 6, there is no impediment to cooling member 25 being provided on both sides of coil 22 to further improve the cooling performance of linear motor 200. Also, as shown in FIG. 7, there is no impediment to providing multiple fans 28 below or above heat dissipation member 27 along the longitudinal direction of heat dissipation member 27 (bobbin 21) to further improve the cooling performance of linear motor 300.

Also, it goes without saying that linear motor 100 of the present embodiment can also be used not just in a moving device for moving a mounting head of an electronic component mounter machine, but also for a moving device for machine tools or transport apparatuses and so on.

SYMBOL DESCRIPTIONS

10: Stator;
11: Permanent magnet (magnetic force generating member);
20: Moving element;
21: Bobbin;
22: Coil;
22a: Gap;
26: Heat transfer member;
26a: Heat collection section;
26b: Heat dissipation section;
27: Heat dissipation member;
100, 200, 300: Linear motor

What is claimed is:

1. A linear motor comprising:
   a stator including multiple magnetic force generating members provided in a row;
   a moving element including multiple coils provided in a row in an axis line direction of the stator and wound around an outside of the stator; and
   a heat transfer member dissipating heat generated by the coils which is between adjacent coils of the multiple coils and along a side of the coils, wherein
   the heat transfer member includes a heat collection section with a flat surface in contact with an end side surface of a coil of the multiple coils and the heat collection section includes a curved outer circumferential surface in a coil winding direction.

2. The linear motor according to claim 1, wherein the heat transfer member is a heat pipe comprising the heat collection section, a heat dissipation section that contacts the heat collecting section and protrudes in a direction away from the coil, and a heat dissipation member provided on the heat dissipation section.

3. The linear motor according to claim 2, wherein the heat dissipation section is located above the heat collection section.

4. The linear motor according to claim 1, wherein the heat transfer member is provided in a gap formed between the adjacent coils to give an outgoing line outside the coil for a wire wound at a beginning or a wire wound at an end of the coil.

\* \* \* \* \*